(12) United States Patent
Hu et al.

(10) Patent No.: US 11,362,403 B2
(45) Date of Patent: Jun. 14, 2022

(54) BATTERY, BATTERY MANAGEMENT METHOD, AND BATTERY CONTROL METHOD

(71) Applicant: Lenovo (Beijing) Co., Ltd., Beijing (CN)

(72) Inventors: Yu Hu, Beijing (CN); Zhihu Wang, Beijing (CN); Shuangcheng Zhao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 242 days.

(21) Appl. No.: 16/727,567

(22) Filed: Dec. 26, 2019

(65) Prior Publication Data

US 2020/0212417 A1 Jul. 2, 2020

(30) Foreign Application Priority Data

Dec. 29, 2018 (CN) .......................... 201811653692.4

(51) Int. Cl.
| | | |
|---|---|---|
| *H02J 7/00* | (2006.01) | |
| *H01M 50/578* | (2021.01) | |
| *H01M 10/48* | (2006.01) | |
| *H01M 10/42* | (2006.01) | |
| *H01M 10/44* | (2006.01) | |

(52) U.S. Cl.
CPC ....... *H01M 50/578* (2021.01); *H01M 10/425* (2013.01); *H01M 10/443* (2013.01); *H01M 10/486* (2013.01); *H01M 2010/4271* (2013.01); *H01M 2200/20* (2013.01)

(58) Field of Classification Search
USPC ........................ 320/106, 107, 108, 109, 110
See application file for complete search history.

(56) References Cited

FOREIGN PATENT DOCUMENTS

| | | | |
|---|---|---|---|
| CN | 105895843 A | 8/2016 | |
| CN | 205828602 U | 12/2016 | |
| CN | 106848486 A | 6/2017 | |
| CN | 108321463 A | 7/2018 | |
| JP | H05319719 A | 12/1993 | |
| JP | 2004503271 A * | 2/2004 | |
| WO | WO-2007037420 A1 * | 4/2007 | ........ H01M 8/04201 |
| WO | WO-2013187096 A1 * | 12/2013 | ............ G01M 3/186 |

\* cited by examiner

*Primary Examiner* — Brian Ngo (74) *Attorney, Agent, or Firm* — Anova Law Group, PLLC (57) ABSTRACT

A battery includes a battery cell, an electronic circuit connected to the battery cell, and a conductive material layer connected to the electronic circuit. The conductive material is located outside the battery cell and separated from the battery cell by a distance.

15 Claims, 3 Drawing Sheets

| Detecting whether a conductive path formed between the conductive material layer and the electronic circuit is broken | S301 |

↓

| When the conductive path formed between the conductive material layer and the electronic circuit is broken, disconnecting the electronic circuit from the battery cells | S302 |

BATTERY, BATTERY MANAGEMENT METHOD, AND BATTERY CONTROL METHOD

CROSS-REFERENCE TO RELATED APPLICATION

This application claims priority to Chinese Patent Application No. 201811653692.4, filed on Dec. 29, 2018, the content of which is incorporated herein by reference in its entirety.

TECHNICAL FIELD

The present disclosure relates to the field of batteries and, more particularly, to a battery, a battery management method, and a battery control method thereof.

BACKGROUND

A battery charging process generally includes a constant current process and a constant voltage process. In the constant current process, a current is constant and a voltage is gradually increased. A charging power is slowly increased, and the time is proportional to a capacity of the battery. Efficiency is high. At an end of the constant current process, when the battery voltage reaches a cut-off voltage, a voltage of a cell in the battery remains constant, and the current gradually decreases. The charging power decreases from a maximum value to a minimum value or even smaller. The charging capacity is not proportional to the time, and the efficiency is low during this time.

Therefore, the working efficiency of the battery is low and cannot meet actual needs. There is a need to provide a battery with high working efficiency.

SUMMARY

One aspect of the present disclosure provides a battery including a battery cell, an electronic circuit connected to the battery cell, and a conductive material layer connected to the electronic circuit. The conductive material is located outside the battery cell and separated from the battery cell by a distance.

Another aspect of the present disclosure provides a battery management method for a battery including a battery cell, an electronic circuit connected to the battery cell, and a conductive material layer connected to the electronic circuit. The conductive material is located outside the battery cell and separated from the battery cell by a distance. The method includes acquiring a temperature of the battery cell and supplying power to the conductive material layer through the electronic circuit in response to a temperature of the battery cell meeting a preset condition.

Another aspect of the present disclosure provides a battery control method for a battery including a battery cell, an electronic circuit connected to the battery cell, and a conductive material layer connected to the electronic circuit. The conductive material is located outside the battery cell and separated from the battery cell by a distance. The method includes detecting whether a conductive path between the conductive material layer and the electronic circuit is broken and, in response to the conductive path being broken, disconnecting the electronic circuit from the battery cell.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various embodiments of the present disclosure provide an electronic device. The electronic device may be a portable terminal (such as a cell phone and a tablet) or another electronic device supporting wireless communication networks.

Hereinafter, embodiments of the present disclosure will be described with reference to the drawings. It should be understood, however, that these descriptions are merely examples and are not intended to limit the scope of the present disclosure. In the following detailed description, for ease of explanation, many specific details are set forth to provide a comprehensive understanding of the embodiments of the present disclosure. It is apparent, however, that one or more embodiments may be implemented without these specific details. In addition, in the following description, descriptions of well-known structures and techniques are omitted to avoid unnecessarily obscuring the concepts of the present disclosure.

The terminology used herein is for the purpose of describing particular embodiments only and is not intended to limit the present disclosure. As used herein, the terms "including," "comprising," and the like indicate the presence of stated features, steps, operations, and/or components, but do not preclude the presence or addition of one or more other features, steps, operations, or components.

All terms (including technical and scientific terms) used herein have the same meaning as commonly understood by one of ordinary skill in the art unless otherwise defined. It should be noted that the terms used herein should be interpreted to have meanings consistent with the context of this specification, and should not be interpreted in an idealized or overly rigid manner.

Where expressions such as "at least one of A, B, or C" are used, they should generally be interpreted in accordance with the meaning commonly understood by those skilled in the art (for example, "a system including at least one of A, B, or C" shall include, but is not limited to, a system with A alone, B alone, C alone, A and B, A and C, B and C, and/or A, B, and C, etc.

Some block diagrams and/or flowcharts are shown in the drawings. It should be understood that some blocks or combinations of block diagrams and/or flowcharts may be implemented by computer program instructions. These computer program instructions may be provided to a processor of a general purpose computer, special purpose computer, or other programmable data processing device, so that when executed by the processor, these instructions may create a device to implement the functions/operations illustrated in the block diagrams and/or flowcharts. The techniques of this disclosure may be implemented in the form of hardware and/or software (including firmware, microcode, etc.). In addition, the technology of the present disclosure may take the form of a computer program product on a computer-readable storage medium storing instructions, which computer program product may be used by or in combination with an instruction execution system.

The present disclosure provides a battery. The battery may include battery cells, an electronic circuit connected to the battery cells, and a conductive material layer connected to the electronic circuit. The conductive material layer and the battery cells may be separated from each other by a first distance, and the conductive material layer may be located outside of the battery cell.

The present disclosure also provides a battery management method. The battery may include battery cells, an electronic circuit connected to the battery cells, and a conductive material layer connected to the electronic circuit. The conductive material layer and the battery cells may be separated from each other by a first distance, and the conductive material layer may be located outside of the battery cells. The battery management method may include acquiring a temperature of the battery cells in the battery and, when the temperature of the battery cells meets a specific condition, providing electrical power to the conductive material layer through the electronic circuit, to make the conductive material layer generate heat and transfer the heat to the battery cells.

The present disclosure also provides a battery control method. The battery may include battery cells, an electronic circuit connected to the battery cells, and a conductive material layer connected to the electronic circuit. The conductive material layer and the battery cells may be separated from each other by a first distance, and the conductive material layer may be located outside of the battery cells. The battery control method may include determining whether a conductive path formed between the conductive material layer and the electronic circuit is open and, when the conductive path is open, disconnecting the electronic circuit from the battery cells.

Figure 1:
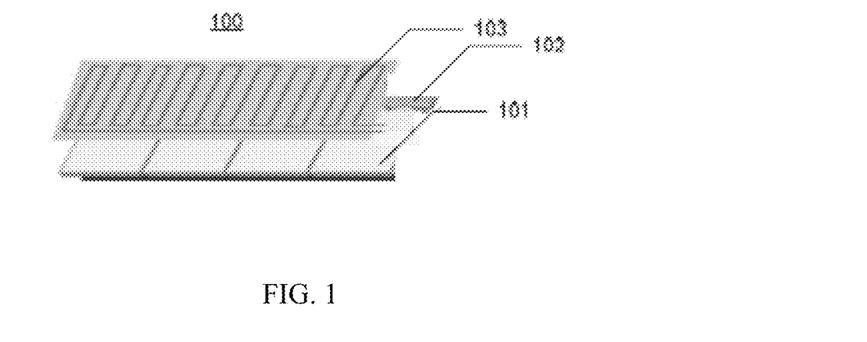
FIG. 1 illustrates a battery consistent with various disclosed embodiments of the present disclosure.

FIG. 1 illustrates a battery 100 provided by one embodiment of the present disclosure. For description purposes only, the embodiment illustrated in FIG. 1 will be used as an example to illustrate the battery provided by the present disclosure, and should not limit the scopes of the present disclosure.

As illustrated in FIG. 1, the battery 100 includes battery cells 101, an electronic circuit 102, and a conductive material layer 103.

The electronic circuit 102 is connected to the battery cells 101. The conductive material layer 103 is connected to the electronic circuit 102. The conductive material layer 103 and the battery cells 101 are separated from each other by a first distance, and the conductive material layer 103 is located outside of the battery cells 101.

In various embodiments, the battery 100 may include one or more battery cells 101, and the present disclosure has no limit on a quantity of the battery cells 101. In the embodiment illustrated in FIG. 1, the battery 100 includes four battery cells 101.

The first distance between the conductive material layer 103 and the battery cells 101 may be configured according to various factors including application of the battery, and the present disclosure has no limit on the first distance. For example, in one embodiment, the battery may be the battery of a computer, the first distance between the conductive material layer 103 and the battery cells 101 may be about 0.5 cm. In another embodiment, the battery may be a battery of an automobile, and the first distance between the conductive material layer 103 and the battery cells 101 may be about 2 cm.

In one embodiment, the electronic circuit 102 may be formed on a printed circuit board (PCB). The conductive material layer 103 may include two terminals connected to the PCB. The terminals may be connected to the electronic circuit on the PCB by a serial or parallel connection. The electronic circuit 102 may further include a current protection device or a temperature protection device according to the actual needs, to improve safety.

In one embodiment, the conductive material layer 103 may be made of a metal material including copper, silver, or a combination thereof.

In the present disclosure, by disposing the conductive material layer outside the battery cells and connecting the conductive material layer and the battery cells in the same circuit, when the conductive material layer generates heat after conducting electrical current, the heat may be transferred to the battery cells, to improve charge and discharge efficiency of the battery cells. Further, since the conductive material layer and the battery cells are connected in the same circuit and are separated by the first distance from each other, if the battery cells expands, whether to disconnect the conductive path of the conductive material layer can be determined by detecting the actual distance between the conductive material layer and the battery cells, to avoid safety issues.

In one embodiment, as shown in FIG. 1, an outer surface of the battery 100 is packaged with a film 104. The film 104 may be made of an insulation material, such as plastics.

In one embodiment, the conductive material layer 103 may have a shape of a metal filament. A resistance of the metal filament may obey the resistance law $R=\rho*l/S=\rho*l/(W*T)$, and a Joule thermal power generated by the metal filament may be $P=I^2*R=I^2*\rho*l/(W*T)$, where R is the resistance of the metal filament, $\rho$ is the resistivity of the metal filament, l is a length of the metal filament, S is an area of a cross-section of the metal filament, W is a width of the metal filament, T is a thickness of the metal filament, I is a current flowing through the conductive material layer 103 (the metal filament).

Figure 2:
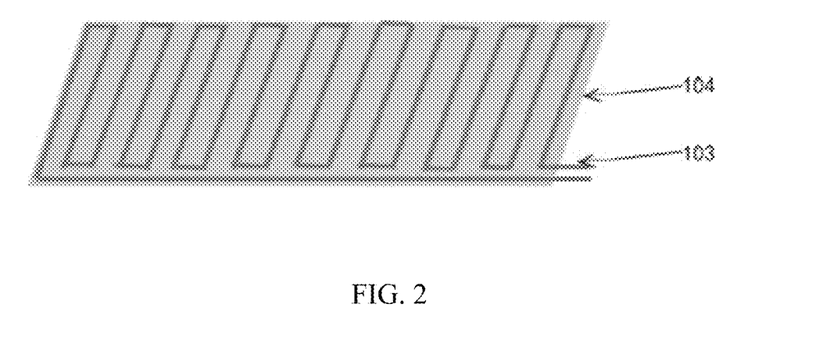
FIG. 2 illustrates a metal filament integrated in a film of a battery consistent with various disclosed embodiments of the present disclosure.

In one embodiment, the conductive material layer 103 (the metal filament) is integrated in the film 104, as illustrated in FIG. 2. By an arrangement of the conductive material layer 103 in the film 104, for example, by adjusting the length, width, and/or thickness of the metal filament, the desired resistance of the metal filament may be achieved.

Correspondingly, the conductive material layer 103 may generate heat when conducting the electrical current, and the heat may be transferred to the battery cells 101.

Figure 3:
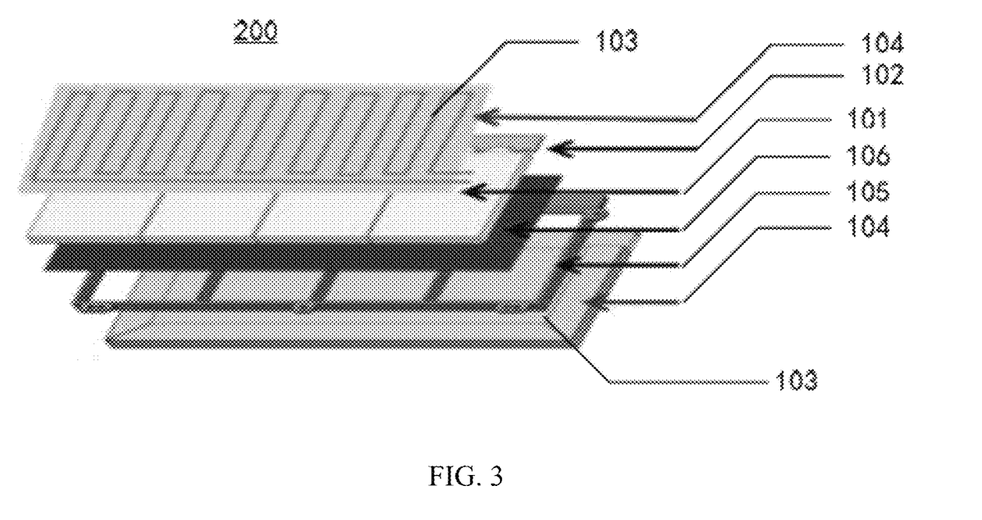
FIG. 3 illustrates another battery consistent with various disclosed embodiments of the present disclosure.

Another embodiment of the present disclosure provides another battery. As illustrated in FIG. 3, the battery 200 includes battery cells 101, an electronic circuit 102, conductive material layers 103, films 104, a frame 105, and an insulation material layer 106.

In one embodiment, when a quantity of the battery cells 101 is larger than one, the battery cells 101 may be fixed by the frame 105. For example, in the embodiment illustrated in FIG. 3, the battery 200 includes four battery cells 101 fixed by the frame 105. In some embodiments, when the battery cells 101 are formed as a whole, the frame 105 may be unnecessary.

In one embodiment, as shown in FIG. 3, two films 104 are used to package the battery 200, and a metal filament is integrated in each film 104. For example, the two films 104 are disposed on an upper side and a bottom side of the battery cells 101, respectively. Correspondingly, when metal filaments in the two films 104 conduct electrical current, the generated heat may be transferred to the battery cells 101 through heat conduction.

In one embodiment, each film 104 may have a composite layer structure. A metal filament may be disposed in a center of a middle layer of the composite layer structure of each film 104, and glue layers may be disposed at an upper side and a bottom side of the metal filament, respectively, to glue the metal filament to protection layers. The glue layers and the protective layers may be made of insulation materials with a certain fire-resistance rating.

Figure 4:
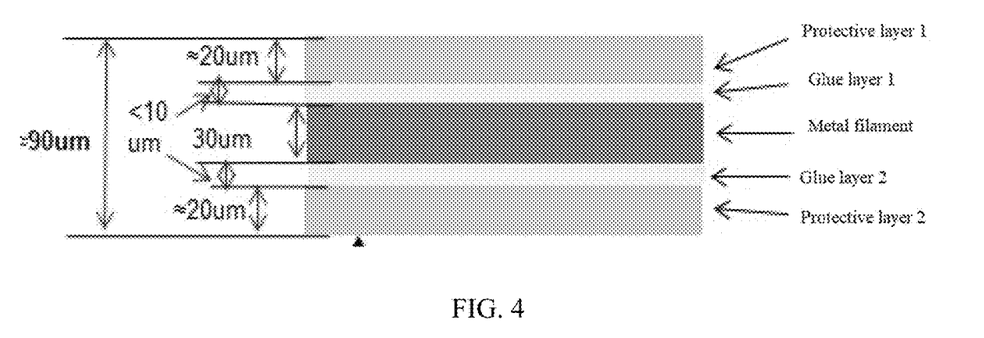
FIG. 4 illustrates a metal filament integrated in a film composite layer of a battery consistent with various disclosed embodiments of the present disclosure.

FIG. 4 is a schematic structural diagram showing arrangement of a metal filament in the composite layer structure of the film 104 according to an embodiment of the disclosure. As shown in FIG. 4, the metal filament is disposed in a center of a middle layer of the composite layer structure of the film 104, and glue layers are disposed at an upper side and a bottom side of the metal filament, respectively, to glue the metal filament to protection layers. A thickness of each protection layer is about 20 µm, and a thickness of each glue layer is smaller than or equal to about 10 µm. A thickness of the metal filament is about 30 µm.

Figure 5:
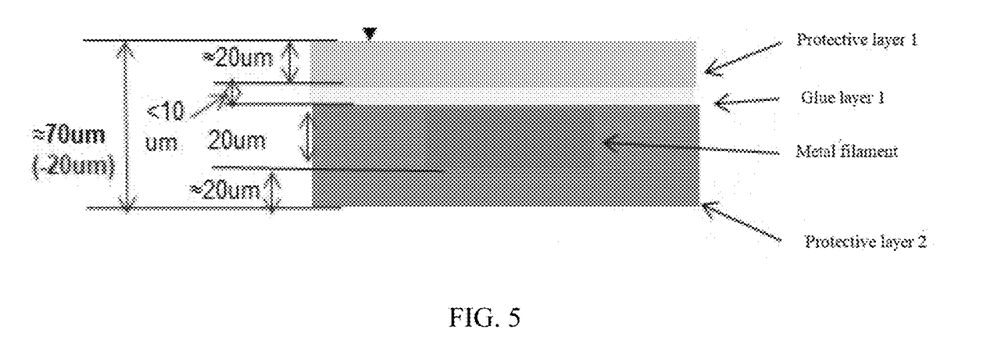
FIG. 5 illustrates another metal filament integrated in a film composite layer of a battery consistent with various disclosed embodiments of the present disclosure.

FIG. 5 is a schematic structural diagram showing arrangement of a metal filament in the composite layer structure of the film 104 according to another embodiment. As shown in FIG. 5, the metal filament is disposed in a center of a middle layer of the composite layer structure of the film 104, and a glue layer is disposed at the upper side of the metal filament, to glue the metal filament to a protection layer, while the bottom side of the metal filament is in direct contact with a protection layer. A thickness of each protection layer is about 20 µm, and a thickness of the glue layer is smaller than or equal to about 10 µm. A thickness of the metal filament is about 20 µm.

For description purposes only, the embodiments illustrated in FIG. 4 and FIG. 5 are used as examples to illustrate the present disclosure, and should not limit the scopes of the present disclosure. In various embodiments, each layer may have any suitable thickness.

A metal filament integrated in one film 104 may be referred to as a thin film resistor. The thin film resistor may be formed by a laser direct structuring process, as described in more detail below. In some embodiments, a metal organic material, such as an organic plastic material containing copper ions, is shaped into a film having a desired size. Laser activation is performed at locations of the film where circuits need to be formed, to form activated areas. The laser activation may release metal ions from the metal organic complex by high temperature and break long chains in the organic plastics to roughen the surface, providing reaction areas for subsequent chemical plating process. A chemical plating process is performed to form circuits in the activated areas, which can act as conductive wires. For example, the copper ions can be reduced to copper metal to form the circuits.

In some embodiment, after the laser activation and chemical plating process, an insulation process may be applied to the formed circuits. For example, the insulation layer may be adhered to the circuit layer by a glue layer.

In one embodiment, an insulation material layer may be disposed between the conductive material layer and the battery cells, and the conductive material layer is separated from the battery cells by the first distance. The conductive material layer may transfer heat to the battery cells when the battery is being charged.

As illustrated in FIG. 3, an insulation material layer 106 is disposed between a conductive material layer 103 and the battery cells 101. The insulation material layer 106 may be made of, e.g., polyester.

In one embodiment, a conductive material layer 103 may be in contact with the battery cells 101 through the insulation material layer 106. When the conductive material layer 103 generates heat, the heat may be transferred to the battery cells 101 by thermal conduction.

Due to the aging and expansion characteristics of the battery during use, there may be a risk of abnormal expansion when the battery is stored and used at a high temperature and a high voltage, or when it is subject to abuse tests such as overcharge and over-discharge.

In another embodiment, the conductive material layer 103 may be in contact with the insulation material layer 106 while may have a gap from the battery cells 101. That is, there may be a certain distance (for example, about 100 µm) between the conductive material layer 103 and the battery cells 101. Whether the battery cells 101 expand can be determined according to this distance. When the conductive material layer is not in contact with the battery cells 101, the heat generated by the conductive material layer may be transferred to the battery cells 101 by thermal diffusion.

In another embodiment, a portion of the conductive material layer 103 may be in contact with the battery cells 101 through the insulation material layer 106, and another portion of the conductive material layer 103 may be not in contact with the battery cells 101. The portion of the conductive material layer 103 in contact with the battery cells 101 may be isolated from the battery cells 101 by the insulation material layer, to avoid short circuit. The portion of the conductive material layer 103 in contact with the battery cells 101 may be used to transfer heat, and the portion of the conductive material layer 103 not in contact with the battery cells 101 may reserve a space for the expansion of the battery cells 101.

When the battery cells 101 expand to a preset extent, the conductive material layer 103 may break, to disconnect the conductive path formed by the conductive material layer 103 and the electronic circuit 102.

In one embodiment, when the battery cells 101 expand and the expansion distance of the battery cells 101 is larger than 5% of the gap, the battery cells 101 may contact the conductive material layer 103. If the battery cells 101 continue to expand, the conductive material layer 103 may elastically deform. If the expansion distance of the battery cells 101 is larger than 10% of the gap, the conductive material layer 103 may be irreversibly damaged and may break.

In another embodiment, a volume of the battery cells 101 may be used as a reference to determine the preset extent of the expansion of the battery cells 101. When the battery cells 101 expand and the volume of the battery cells 101 is expanded by 5%, the battery cells 101 may contact the conductive material layer 103. If the battery cells 101 continue to expand, the conductive material layer 103 may elastically deform. If the volume of the battery cells 101 is expanded by 10%, the conductive material layer 103 may be irreversibly damaged and may break.

An elastic deformation amount of the conductive material layer 103 may be obtained by experiments. In one embodiment where the conductive material layer 103 is formed by laser activation, the elastic deformation of the conductive material layer 103 may be small. The gap between the conductive material layer 103 and the battery cells 101 may be adjusted to make the conductive material layer 103 break when the battery cells 101 expand to the preset extent.

Figure 6:
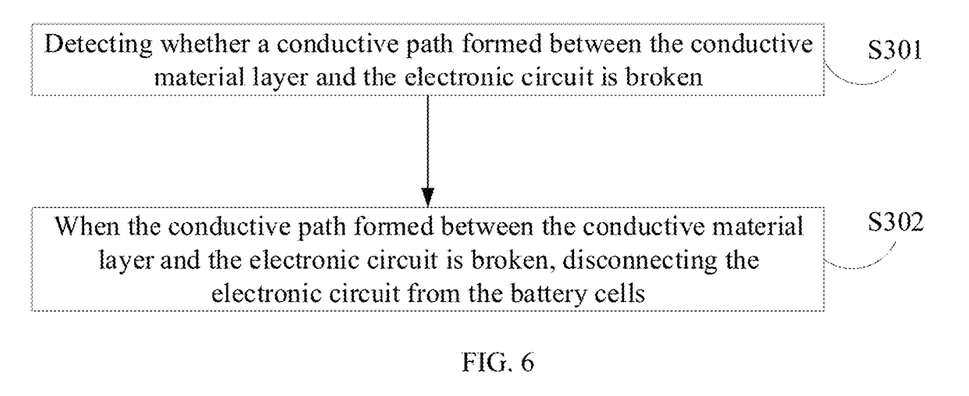
FIG. 6 illustrates a battery control method consistent with various disclosed embodiments of the present disclosure.

The present disclosure also provides a battery control method. As illustrated in FIG. 6, the battery control method includes the following:

S301: detecting whether the conductive path between the conductive material layer and the electronic circuit is broken.

S302: disconnecting the connection between the electronic circuit and the battery cells when the conductive path between the conductive material layer and the electronic circuit is broken.

The conductive material layer 103 may break when the battery cells 101 expand to the preset extent, and the conductive path between the conductive material layer and the electronic circuit is broken.

During the battery charging and discharging process, the battery can automatically detect the current in the conductive path formed between the conductive material layer and the electronic circuit. When the battery detects an open circuit, it may be determined that one of the battery cells may have over-expanded. The electronic circuit can be disconnected from the battery cells. For example, the battery's fuse may be actively blown, and the battery will permanently fail. In another embodiment, the user can be prompted to replace the battery. To further avoid the impact of battery performance degradation, besides prompting the user that the battery should be replaced and reducing the performance of the system after the prompt, the user may be further prompted that the battery will fail after a period of time, and then the battery may be controlled to fail after a certain period of time (for example, several hours).

In the present disclosure, the battery can automatically detect the current in the conductive path formed between the conductive material layers and the electronic circuit, thereby to determine whether the battery cells in the battery have over-expanded. By determining whether one of the battery cells in the battery has over-expanded using the above method, extra sensors may be unnecessary in the battery. A manufacturing cost of the battery may be low and the thickness of the battery may not be taken up. Furthermore, the safety of the battery can be improved, and the battery can be protected in the initial stage of the abnormal expansion.

The present disclosure also provides a battery management method.

The battery may include battery cells, an electronic circuit, and a conductive material layer.

Figure 7:
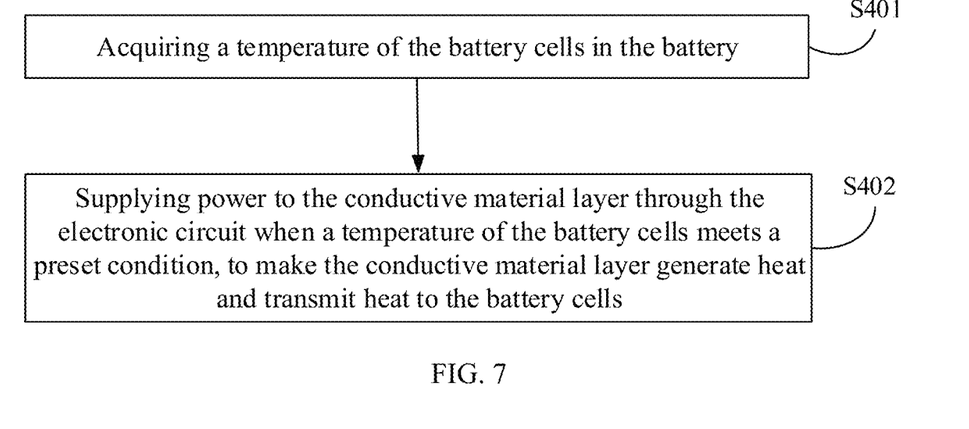
FIG. 7 illustrates a battery management method consistent with various disclosed embodiments of the present disclosure.

As illustrated in FIG. 7, the battery management method includes the following.

S401: acquiring the temperature of the battery cells of the battery.

S402: providing electrical power to the conductive material layer through the electronic circuit when the temperature of the battery cells meets a specific condition, to make the conductive material layer generate heat and transfer the heat to the battery cells.

In one embodiment, the conductive material layer may be disposed outside the battery cells, and may be used as a heating vest for the battery cells. The heating vest may be connected in series or in parallel with multiple protection devices to achieve multiple protection. In a low temperature range, the heating vest may heat the battery cell to a normal temperature, and then the battery may be charged or discharged quickly, to improve the working efficiency of the battery.

The electronic circuit may include a control circuit for controlling a state of power supply to the conductive material layer according to the temperature condition.

In one embodiment, the control circuit may be a control switch. For example, when the temperature of the battery cells is about 15 Celsius degrees, the control switch may be closed, so that power can be supplied to the conductive material layer. When the temperature of the battery cells is about 25 Celsius degrees, the control switch may be opened, so that the power supply to the conductive material can be stopped.

In existing technologies, an adapter can output constant power to a battery. The charging power required by the battery will go from small to large, and then will start to become smaller until charging stops. Therefore, the power of the adapter is not effectively used during the early charging period and the later charging period.

In the present disclosure, in the early charging period, due to the low power and voltage of the battery cells, the underutilized adapter power may be used to supply power to the conductive material layer to increase the temperature of the battery cells. Correspondingly, the power of the adapter may be utilized efficiently, and the current battery can be directly used for fast charging without changing the design of the battery and without sacrificing energy density to achieve fast charging.

When the temperature of the battery cells meets a preset condition and the power supply to the conductive material layer using the electronic circuit is achieved by connecting the battery to a power source through the adapter, the adapter may be controlled to supply power to the conductive material layer with a first power through the electronic circuit and to charge the battery cells with a second power through the electronic circuit, when the current temperature of the battery cells is lower than or equal to a first temperature threshold.

In one embodiment, the first temperature threshold may be about 15° C. When the battery is connected to the adapter, the temperature may be acquired by a thermoresistor in the battery. When the temperature is lower than or equal to 15° C., the adapter may charge the battery using 30%~50% of the rated power. A remaining 50%~70% of the rated power, which is not used for charging, may be used to supply power to the conductive material layer. The conductive material layer may be heated to increase the temperature of the battery cells.

In the present disclosure, the power of the adapter may be distributed to the battery cells and the conductive material layer. The power of the adapter may be utilized efficiently and utilization efficiency of the adapter may be improved.

When the current temperature of the battery cells is higher than the first temperature threshold and lower than or equal to a second temperature threshold, the output power of the adapter may be adjusted. The adapter may be controlled to supply power to the conductive material layer with a third power through the electronic circuit and to charge the battery cells with a fourth power through the electronic circuit.

In one embodiment, the second temperature threshold may be about 25° C. When the temperature is higher than 15° C. and lower than or equal to 25° C., the output power of the adapter may be adjusted.

When the battery is being charged, the charging voltage of the battery cells may gradually increase, and the current may not change. Correspondingly, the charging power required by the battery cells may increase. The power for heating the conductive material layer may be correspondingly reduced. Because the conductive material layer is always heating, the temperature of the battery cells can still be increased.

In one embodiment, the third power may be 30%~50% of the rated power of the adapter, and the fourth power may be 50%~70% of the rated power of the adapter. The adapter may use 30%~50% of the rated power to supply power to the conductive material layer, and may charge the battery using 50%~70% of the rated power.

In the present disclosure, the fast charging may be achieved by using the smaller resistance of the battery cells at the higher temperature. The charging current and the charging power of the battery cells may be reduced. Also, the adapter with a small rated power may be used to achieve fast charging. The cost of the adapter may be reduced.

After the adapter is controlled to supply power to the conductive material layer with 30%~50% of the rated power, the current temperature of the battery cells may be acquired and it may be determined whether the current temperature of the battery cells is higher than or equal to a third temperature threshold. When the current temperature of the battery cells is higher than or equal to the third temperature threshold, the adapter may be controlled to stop supplying power to the conductive material layer.

For example, in one embodiment, when the current temperature of the battery cells is detected to be higher than or equal to 35° C., the adapter may stop supplying power to the conductive material layer, and all of the power of the adapter may be allocated to charging the battery. Charging time for the battery cells may be reduced and the charging efficiency may be improved.

In one embodiment, for the battery cells that originally cannot achieve rapid charging, the battery cells may be charged rapidly using the above methods. For example, when the battery detects that the current temperature of the battery cells is higher than 25° C., a major portion of the power of the adapter may be used to charge the battery, and battery cells may be fully charged with 1 C or 1.2 C when the temperature is about 25° C. to about 45° C. A portion of the power of the adapter may be used to heat the battery. When the voltage of the battery increases, the charging power may increase and the power for heating the conductive material layer may decrease. The battery cells may be heated to about 35° C. by adding the Joule heat of the battery cells. The charging time of the battery cells may be reduced and the battery cells that originally cannot achieve rapid charging may be charged rapidly.

In one embodiment, when the adapter is a small adapter that the current provided by the adapter is smaller than the rapid charging current, the charging procedure may be: when the temperature of the battery cells is higher than or equal to 25° C., the current of the adapter may be totally used to heat the conductive material, to heat the battery cells to about 35° C.; and when the temperature of the battery cells is higher than 35° C., the largest current that the adapter can provide may be used to charge the battery cells. Correspondingly, the charging time of the battery may be reduced by about 20 minutes to about 30 minutes. The rapid charging may be achieved.

The present disclosure also provides a battery control device. The battery control device may include a detecting module and a control module.

The detecting module may detect whether the conductive path between the conductive material layer and the electronic circuit is broken. The control module may disconnect the electronic circuit from the battery cells when the conductive path between the conductive material layer and the electronic circuit is broken.

The present disclosure also provides a battery management device. The battery management device may include an acquisition module and a processing module.

The acquisition module may acquire the temperature of the battery cells in the battery. The processing module may supply power to the conductive material layer when the temperature of the battery cells meets a preset condition, to make the conductive material layer generate heat and transfer heat to the battery cells.

At least some of the modules, sub-modules, units, or sub-units according to the embodiments of the present disclosure, or at least part of the functions of any of them, can be implemented in one module. Anyone or more of the modules, sub-modules, units, and sub-units according to the embodiments of the present disclosure may be implemented by being split into multiple modules. Anyone or more of the modules, sub-modules, units, and sub-units according to the embodiments of the present disclosure may be at least partially implemented as a hardware circuit, such as a field-programmable gate array (FPGA), a programmable logic array (PLA), System-on-chip, system-on-substrate, system-on-package, application-specific integrated circuit (ASIC), or any other reasonable means of hardware or firmware that can integrate or package the circuit. Anyone or more of the modules, sub-modules, units, and sub-units according to the embodiments of the present disclosure may be implemented by software, hardware, firmware, or any combination thereof. Alternatively, one or more of the modules, submodules, units, and sub-units according to the embodiments of the present disclosure may be at least partially implemented as computer program modules, and when the computer program modules are executed, corresponding functions may be performed.

For example, one or more of the detecting module, the control module, the acquisition module, and the processing module, can be implemented in one module. Or any one of the detecting module, the control module, the acquisition module, and the processing module may be implemented by being split into multiple modules. At least one of the detecting module, the control module, the acquisition module, and the processing module may be at least partially implemented as a hardware circuit, such as a field-programmable gate array (FPGA), a programmable logic array (PLA), System-on-chip, system-on-substrate, system-on-package, application-specific integrated circuit (ASIC), or any other reasonable means of hardware or firmware that can integrate or package the circuit. At least one of the detecting module, the control module, the acquisition module, and the processing module may be implemented by software, hardware, firmware, or any combination thereof. Alternatively, one or more of the detecting module, the control module, the acquisition module, and the processing module may be at least partially implemented as computer program modules, and when the computer program modules are executed, corresponding functions may be performed.

Figure 8:
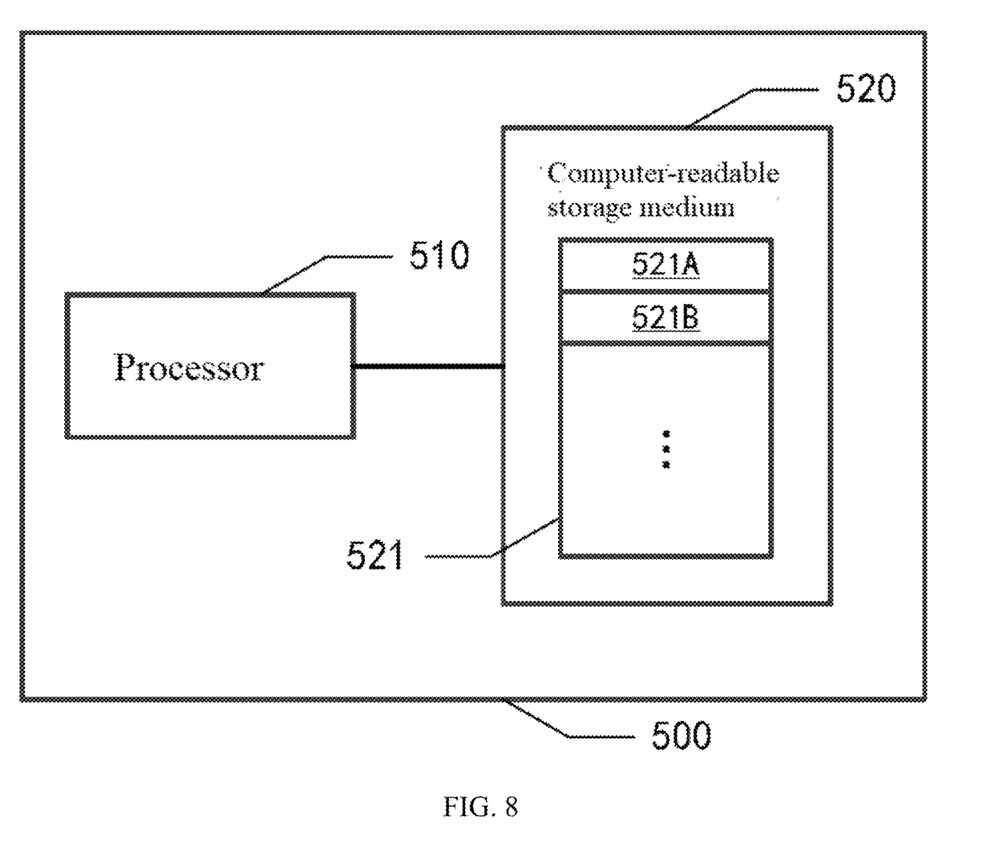
FIG. 8 illustrates a computer system configured to perform a method consistent with various disclosed embodiments of the present disclosure.

FIG. 8 illustrates a computer system 500 for performing the above functions, e.g., the computer system 500 can be the battery control device or the battery management device described above. For description purposes only, the embodiment in FIG. 8 is used as an example to illustrate the present disclosure, and should not limit the scopes of the present disclosure.

As illustrated in FIG. 8, the computer system 500 includes a processor 510 and a computer-readable storage medium 520. The computer system 500 may execute a method according to various embodiments of the present disclosure.

Specifically, the processor 510 may include, for example, a general-purpose microprocessor, an instruction set processor and/or an associated chipset and/or a special-purpose microprocessor (for example, an application-specific integrated circuit (ASIC)), and so on. The processor 510 may also include an on-board memory for caching purposes. The processor 510 may be a single processing unit or multiple processing units for performing different actions of the method according to various embodiments of the present disclosure.

The computer-readable storage medium 520 may be a non-volatile computer-readable storage medium. The non-volatile computer-readable storage medium may include, but are not limited to: a magnetic storage device such as a magnetic tape or a hard disk (HDD), an optical storage device such as an optical disk (CD-ROM), or a memory such as a random access memory (RAM) or a flash memory.

The computer-readable storage medium 520 may be configured to store a computer program 521. The computer program 521 may include codes/computer-executable instructions, and may cause the processor 510 to perform a method according to various embodiments of the present disclosure or any variation thereof when it is executed by the processor 510.

The computer program 521 may be configured to be a computer program code including computer program modules. For example, in one embodiment, the code in the computer program 521 may include one or more program modules, including, for example, a module 521A, a module 521B, . . . . It should be noted that the division manner and number of modules are not fixed, and those skilled in the art can use appropriate program modules or program module combinations according to actual conditions. When these program module combinations are executed by the processor 510, the processor 510 can perform a method according to various embodiments of the present disclosure or any variation thereof.

According to an embodiment of the present disclosure, at least one of the detection module, the control module, the acquisition module, or the processing module may be implemented as a computer program module described with reference to FIG. 7, which, when executed by the processor 310, may implement the corresponding operations described above.

The present disclosure also provides a computer-readable storage medium, which may be included in the device/apparatus/system described in the above embodiments; or may exist separately without being assembled to the device/device/system. The computer-readable storage medium carries one or more programs, and when the one or more programs are executed, a method according to an embodiment of the present disclosure is implemented.

According to an embodiment of the present disclosure, the computer-readable storage medium may be a non-volatile computer-readable storage medium, which may include, but is not limited to, a portable computer disk, a hard disk, a random access memory (RAM), a read-only memory (ROM), an erasable programmable read-only memory (EPROM or flash memory), a portable compact disk read-only memory (CD-ROM), an optical storage device, magnetic storage device, or any suitable combination thereof. In this disclosure, a computer-readable storage medium may be any tangible medium that contains or stores a program that can be used by or in combination with an instruction execution system, apparatus, or device.

The flowchart and block diagrams in the figures illustrate the architecture, functionality, and operation of possible implementations of systems, methods. and computer program products according to various embodiments of the present disclosure. In this regard, each block in the flowchart or block diagram may represent a module, program segment, or part of code, which contains one or more executable instructions for implementing specified logic functions. It should also be noted that in some implementations, the functions noted in the blocks may also occur in a different order than that shown in the drawings. For example, two blocks connected one after the other may actually be executed substantially in parallel, and they may sometimes be executed in the reverse order, depending on the functions involved. It should also be noted that each block in the block diagram or flowchart, and combinations of blocks in the block diagram or flowchart, can be implemented with a dedicated hardware-based system that performs the specified function or operation, or can be implemented with a combination of dedicated hardware and computer instructions.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated in another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physical unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A battery comprising:
    a battery cell;
    an electronic circuit connected to the battery cell; and
    a conductive material layer connected to the electronic circuit, the conductive material being located outside the battery cell and separated from the battery cell by a distance,
    wherein:
    the battery is connected to a power source through an adapter; and
    the electronic circuit includes a control circuit configured to control power supply to the conductive material layer, acquire a temperature of the battery cell, and control the adapter to, in response to the temperature of the battery cell being lower than or equal to a temperature threshold, supply power to the conductive material layer with a first power and charge the battery cell with a second power.

2. The battery according to claim 1, further comprising:
    an insulation material layer between the conductive material layer and the battery cell;
    wherein the distance is configured to allow the conductive material layer to transfer heat to the battery cell during a process of charging the battery.

3. The battery according to claim 1, wherein the conductive material layer is configured to break in response to the battery cell expanding to a target extent, to break a conductive path formed between the conductive material layer and the electronic circuit.

4. The battery according to claim 1, wherein the temperature threshold is about 15° C.

5. The battery according to claim 1, wherein:
    the temperature threshold is a first temperature threshold;
    the control circuit is further configured to control the adapter to, in response to the temperature of the battery cell being higher than the first temperature threshold and lower than or equal to a second temperature threshold higher than the first temperature threshold, supply power to the conductive material layer with a third power lower than the first power and charge the battery cell with a fourth power higher than the second power.

6. The battery according to claim 5, wherein the first temperature threshold is about 15° C. and the second temperature threshold is about 25° C.

7. The battery according to claim 5, wherein the control circuit is further configured to control the adaptor to, in response to the temperature of the battery cell being higher than or equal to a third temperature threshold higher than the second temperature threshold, stop supplying power to the conductive material layer.

8. A battery management method comprising:
    acquiring a temperature of a battery cell of a battery, the battery being connected to a power source through an adapter, the battery further including:
        an electronic circuit connected to the battery cell; and
        a conductive material layer connected to the electronic circuit, the conductive material layer being located outside the battery cell and separated from the battery cell by a distance;
    supplying power to the conductive material layer through the electronic circuit in response to a temperature of the battery cell meeting a preset condition; and
    controlling the adapter to, in response to the temperature of the battery cell being lower than or equal to a temperature threshold, supply power to the conductive material layer with a first power through the electronic circuit and charge the battery cell with a second power through the electronic circuit.

9. The method according to claim 8, wherein the temperature threshold is about 15° C.

10. The method according to claim 8, wherein:
    the temperature threshold is a first temperature threshold; and
    supplying power to the conductive material layer further includes controlling the adapter to, in response to the temperature of the battery cell being higher than the first temperature threshold and lower than or equal to a second temperature threshold higher than the first temperature threshold, supply power to the conductive material layer with a third power lower than the first power through the electronic circuit and charge the battery cell with a fourth power higher than the second power through the electronic circuit.

11. The method according to claim 10, wherein the first temperature threshold is about 15° C. and the second temperature threshold is about 25° C.

12. The method according to claim 10, further comprising:
    in response to the temperature of the battery cell being higher than or equal to a third temperature threshold higher than the second temperature threshold, controlling the adapter to stop supplying power to the conductive material layer.

13. The method according to claim 12, wherein the second temperature threshold is about 25° C. and the third temperature threshold is about 35° C.

14. The method according to claim 8, wherein:
    the first power is about 50%~70% of a rated power of the adapter; and
    the second power is about 30%~50% of the rated power of the adapter.

15. A battery control method comprising:
    detecting whether a conductive path between a conductive material layer of a battery and an electronic circuit of the battery is broken, the battery further including a battery cell, the electronic circuit being connected to the battery cell, the conductive material layer being connected to the electronic circuit, and the conductive material layer being located outside the battery cell and separated from the battery cell by a distance;

determining that the conductive path is broken in response to the battery cell expanding to a target extent that causes the conductive material layer to break; and in response to the conductive path being broken, disconnecting the electronic circuit from the battery cell.

* * * * *